(12) United States Patent
Mori et al.

(10) Patent No.: US 8,613,193 B2
(45) Date of Patent: Dec. 24, 2013

(54) VEHICLE WASTE HEAT RECOVERY DEVICE

(75) Inventors: Hidefumi Mori, Aichi (JP); Masao Iguchi, Aichi (JP); Fuminobu Enokijima, Aichi (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 62 days.

(21) Appl. No.: 13/355,614

(22) Filed: Jan. 23, 2012

(65) Prior Publication Data

US 2012/0240575 A1 Sep. 27, 2012

(30) Foreign Application Priority Data

Mar. 25, 2011 (JP) ................................. 2011-067453
Jun. 2, 2011 (JP) ................................. 2011-124075

(51) Int. Cl.
*F01K 23/10* (2006.01)
*F01K 25/00* (2006.01)

(52) U.S. Cl.
USPC .............................................. 60/618; 60/670

(58) Field of Classification Search
USPC ........... 60/614–616, 618, 645, 651, 670–671, 60/660–667; 418/55.1, 55.5
See application file for complete search history.

(56) References Cited

U.S. PATENT DOCUMENTS

| | | | |
|---|---|---|---|
| 5,186,613 A * | 2/1993 | Kotlarek et al. | 417/292 |
| 7,338,265 B2 * | 3/2008 | Grassbaugh et al. | 418/55.1 |
| 7,950,230 B2 * | 5/2011 | Nishikawa et al. | 60/618 |
| 8,186,161 B2 * | 5/2012 | Ast et al. | 60/660 |
| 8,415,815 B2 * | 4/2013 | Wada | 290/2 |
| 2005/0217288 A1 | 10/2005 | Uno et al. | |
| 2006/0225421 A1 | 10/2006 | Yamanaka et al. | |
| 2010/0090476 A1 | 4/2010 | Wada | |
| 2010/0307155 A1 | 12/2010 | Kasuya et al. | |
| 2011/0192163 A1 * | 8/2011 | Kasuya | 60/624 |

FOREIGN PATENT DOCUMENTS

| | | |
|---|---|---|
| JP | 2002-155707 A | 5/2002 |
| JP | 2005-325746 A | 11/2005 |
| JP | 2007-322095 A | 12/2007 |
| JP | 2009-138552 A | 6/2009 |
| JP | 2010-065587 A | 3/2010 |

OTHER PUBLICATIONS

Extended Search Report in corresponding European Patent Application No. 12150231.4 dated Aug. 28, 2013.
Office Action in corresponding Chinese Patent Application No. 201210080229.1 dated Jul. 12, 2013.

* cited by examiner

*Primary Examiner* — Thomas Denion
*Assistant Examiner* — Ngoc T Nguyen
(74) *Attorney, Agent, or Firm* — Sughrue Mion, PLLC

(57) ABSTRACT

When a detection value of a temperature sensor exceeds a set temperature, an ECU increases an opening of a sub-port by controlling a solenoid valve, and as a result, an intake volume of an expander increases. The ECU then adjusts the mass flow rate of a coolant flowing through a boiler so that a detection value of a pressure sensor indicates a pressure as close as possible to an upper limit pressure, on condition that an upper limit temperature is not exceeded.

6 Claims, 7 Drawing Sheets

VEHICLE WASTE HEAT RECOVERY DEVICE

BACKGROUND OF THE INVENTION

1. Field of the Invention

The present invention relates to a vehicle waste heat recovery device, and more particularly to a vehicle waste heat recovery device employing a Rankine cycle.

2. Description of the Related Art

In response to calls from society for reductions in the amount of discharged carbon dioxide ($CO_2$), there is a need for improvements in the fuel efficiency of vehicles having an engine, such as automobiles, and therefore techniques for making effective use of energy generated by the vehicle that would simply be discharged conventionally are currently being developed. For example, a waste heat utilization device employing a Rankine cycle to convert heat discharged from the engine, such as the heat of cooling water and the heat of exhaust gas, into power for a power generator and so on is available. The Rankine cycle is constituted by a boiler that generates superheated steam by isobarically heating a liquid phase fluid serving as a working fluid of the Rankine cycle, an expander that obtains power by adiabatically expanding the superheated steam, a condenser that liquefies the steam expanded in the expander by isobarically cooling the expanded steam, and a pump that feeds the liquefied liquid phase fluid to the boiler.

Japanese Patent Application Publication No. 2010-65587 describes an example of this type of conventional Rankine cycle, in which output assistance is provided to an engine using energy from waste heat collected by an expander. A Rankine cycle typically improves in efficiency as pressure of the working fluid increases, and therefore the pressure of the working fluid flowing out of the boiler is controlled in the vicinity of a high pressure limit (an upper limit pressure) by adjusting the mass flow rate of the working fluid flowing through the boiler.

However, the ratio between the rotation speed of the engine and the amount of waste heat from the engine, or in other words the amount of heat recovered by the boiler, is not typically fixed, and therefore, when the amount of heat recovered by the boiler is excessively large relative to the mass flow rate of the working fluid flowing into the boiler, for example, such that the temperature of the working fluid flowing out of the boiler increases, the density of the working fluid must be reduced by reducing the mass flow rate of the working fluid flowing through the boiler, or the amount of heat exchange performed in the boiler must be limited, in order to keep the pressure of the working fluid at or below the upper limit pressure. As a result, the waste heat of the engine cannot be used effectively, and therefore the thermal efficiency of the Rankine cycle decreases.

SUMMARY OF THE INVENTION

The present invention has been designed to solve this problem, and an object thereof is to provide a vehicle waste heat recovery device employing a Rankine cycle with which reductions in thermal efficiency can be suppressed even when the ratio between the rotation speed of an engine and the amount of waste heat varies.

The present invention provides a vehicle waste heat recovery device comprising: a Rankine cycle constituted by a pump that pumps a working fluid, an expander that obtains mechanical energy by expanding the working fluid, a high pressure path that leads the working fluid discharged from the pump to the expander, a low pressure path that leads the working fluid discharged from the expander to the pump, a heat exchanger provided on the high pressure path to heat the working fluid by using waste heat from an engine of a vehicle, and a condenser provided on the low pressure path to condense the expanded working fluid; a temperature ascertaining device for ascertaining a temperature of the working fluid flowing out of the heat exchanger; a pressure ascertaining device for ascertaining a pressure of the working fluid flowing out of the heat exchanger; and an intake volume varying assembly for adjusting an intake volume of the expander, wherein the expander is coupled to the engine to be capable of transmitting power thereto, a threshold being set in advance in relation to one of the temperature ascertained by the temperature ascertaining device and the pressure ascertained by the pressure ascertaining device such that when the threshold is exceeded, the intake volume varying assembly increases the intake volume of the expander, whereupon a flow rate of the working fluid flowing through the heat exchanger is adjusted on the basis of the other one of the temperature ascertained by the temperature ascertaining device and the pressure ascertained by the pressure ascertaining device.

DESCRIPTION OF THE PREFERRED EMBODIMENTS

Embodiments of the present invention will be described below on the basis of the attached drawings.

First Embodiment

Figure 1:
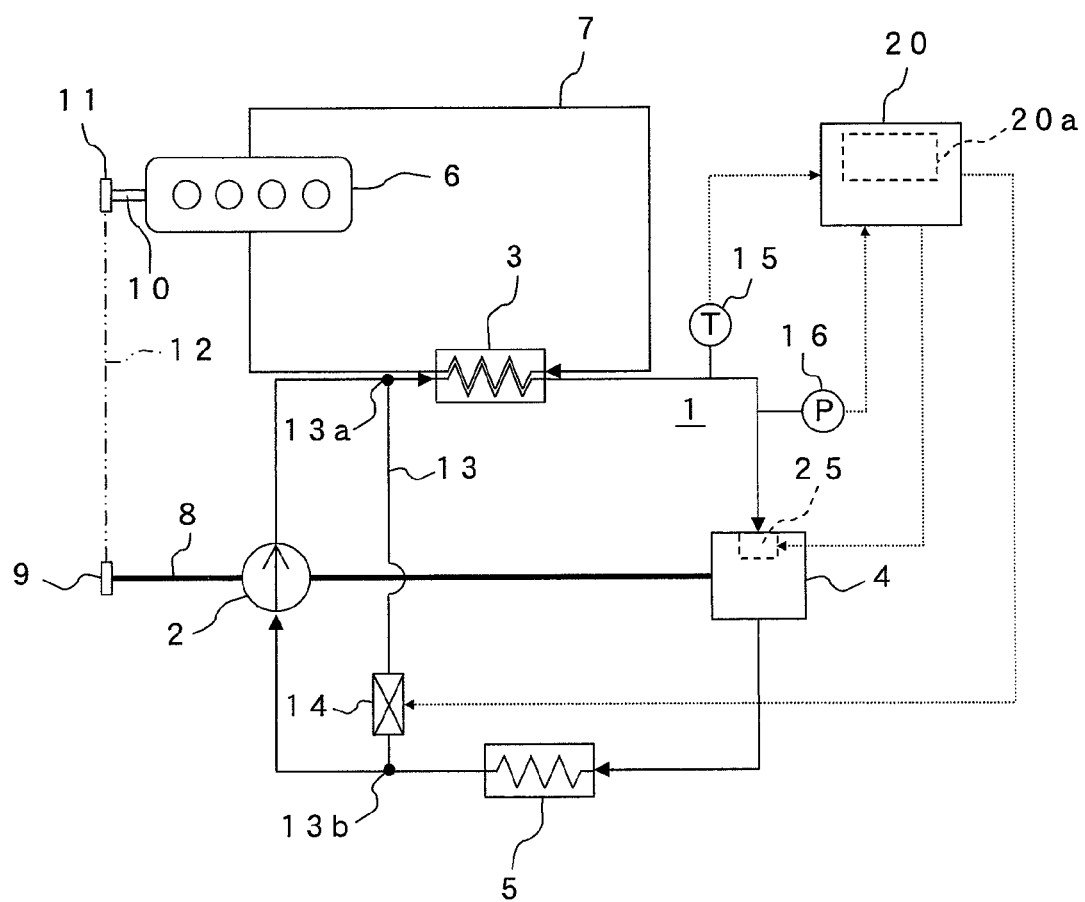
FIG. 1 is a constitutional diagram of a vehicle waste heat recovery device according to a first embodiment of the present invention.

As shown in FIG. 1, a vehicle waste heat recovery device according to a first embodiment includes a Rankine cycle 1 constituted by a pump 2, a boiler 3, an expander 4 which is a scroll expander, and a condenser 5. The boiler 3 is a heat exchanger that absorbs waste heat from a vehicle, for example heat contained in cooling water 7 after cooling an engine 6, into a coolant (a working fluid) circulating through the Rankine cycle 1. The pump 2 and the expander 4 share a single drive shaft 8. A pulley 9 is provided on one end of the drive shaft 8, and a belt 12 is wrapped around the pulley 9 and a pulley 11 provided on a crankshaft 10 of the engine 6.

Figure 2:
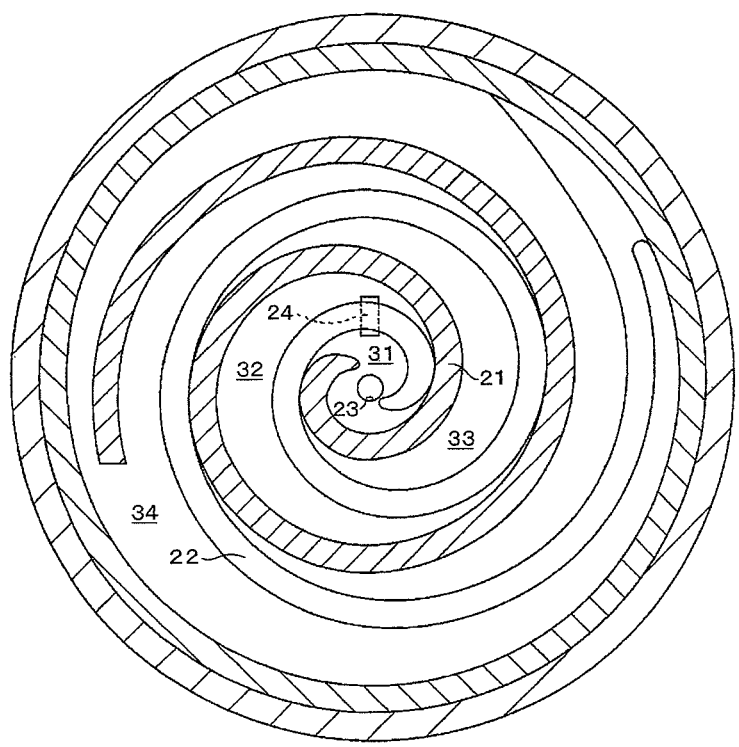
FIG. 2 is an upper sectional view of an expansion mechanism portion of an expander provided in the vehicle waste heat recovery device according to the first embodiment.

FIG. 2 shows an upper sectional view of an expansion mechanism portion of the expander 4. A spiral-shaped fixed scroll 21 is fixed within the expansion mechanism portion, and a turning scroll 22 is provided to be capable of turning relative to the fixed scroll 21 while meshed thereto. When the turning scroll 22 turns, the turning scroll 22 partially comes into contact with the fixed scroll 21 such that a plurality of expansion spaces (indicated in FIG. 2 by reference numerals 31, 32, 33, 34) having different volumes are formed between the fixed scroll 21 and the turning scroll 22. A main port 23 through which the coolant flows into the expansion mechanism portion is provided in a central part of the expansion mechanism portion. The main port 23 communicates directly with the expansion space 31 positioned in the most central part of the expansion mechanism portion. The expansion mechanism portion is also provided with a sub-port 24 that communicates with the expansion space 32 adjacent to the expansion space 31.

Figure 3:
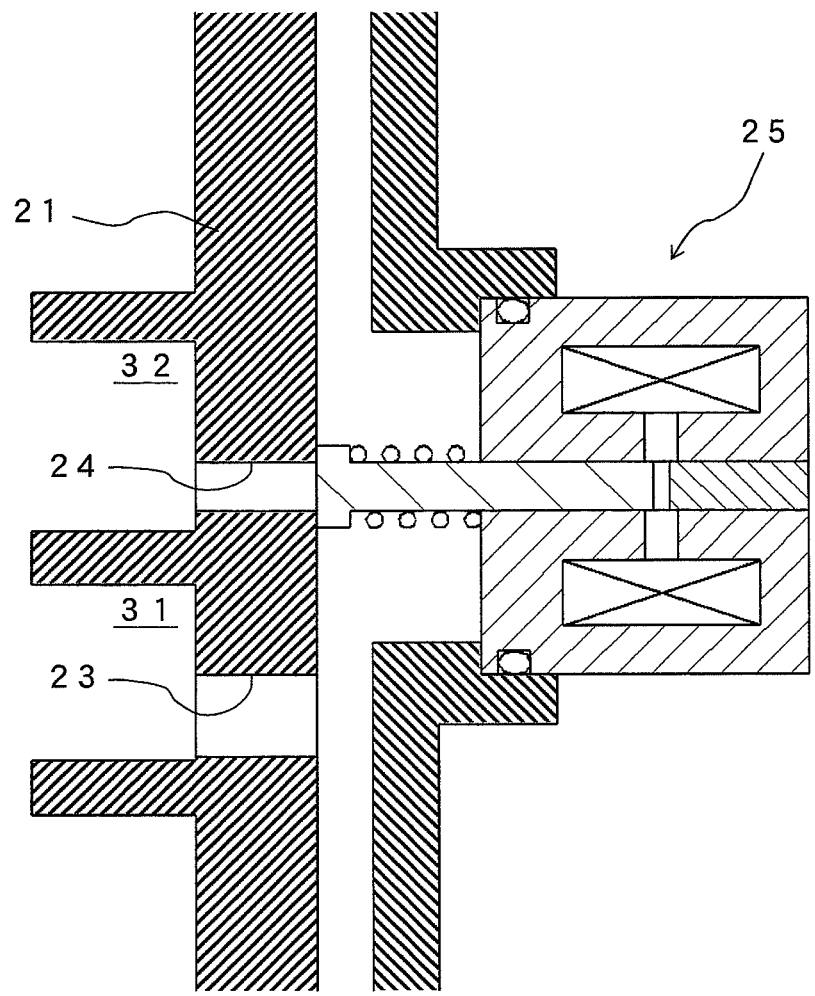
FIG. 3 is a lateral direction sectional view of the expansion mechanism portion of the expander provided in the vehicle waste heat recovery device according to the first embodiment.

As shown in FIG. 3, a solenoid valve 25 is provided to open and close the sub-port 24 from an opposite side to the side on which the respective expansion spaces exist. When the solenoid valve 25 closes the sub-port 24, the coolant flows into the expansion space 31 only through the main port 23. When the solenoid valve 25 opens the sub-port 24, on the other hand, the coolant flows into both expansion spaces 31 and 32 through the main port 23 and the sub-port 24. In other words, by having the solenoid valve 25 open and close the sub-port 24, the volume of coolant taken in by the expander 4 during a fixed cycle is modified, and as a result, an expansion ratio is modified. The intake volume can be modified continuously by making fine adjustments to the opening of the sub-port 24 (displacement of the solenoid valve 25). Here, the sub-port 24 and the solenoid valve 25 together constitute an intake volume varying assembly for adjusting the intake volume of the expander 4.

As shown in FIG. 1, the Rankine cycle 1 is provided with a bypass passage 13, a high pressure path side end portion 13a of which is positioned between the pump 2 and the boiler 3 and a low pressure path side end portion 13b of which is positioned between the condenser 5 and the pump 2. A flow control valve 14 serving as a flow rate control device for adjusting the flow rate of the coolant flowing through the bypass passage 13 is provided in the bypass passage 13. Further, a temperature sensor 15 serving as a temperature ascertaining device for detecting the temperature of the coolant and a pressure sensor 16 serving as a pressure ascertaining device for detecting the pressure of the coolant are provided in the Rankine cycle 1 between the boiler 3 and the expander 4. The flow control valve 14, the temperature sensor 15, the pressure sensor 16, and the solenoid valve 25 provided in the expander 4 are respectively connected electrically to an ECU 20 serving as a vehicle control device. The ECU 20 includes a storage unit 20a storing an upper limit temperature $T_0$ for the temperature detected by the temperature sensor 15, a set temperature $T_1$ serving as a threshold, an upper limit pressure $P_0$ for the pressure detected by the pressure sensor 16, and a set pressure $P_1$ serving as a threshold. Note that the upper limit temperature $T_0$, the set temperature $T_1$, the upper limit pressure $P_0$, and the set pressure $P_1$ take values set appropriately in accordance with the type of coolant, the specifications of the Rankine cycle, and so on. Further, a map for determining the intake volume, or more specifically the displacement of the solenoid valve 25 corresponding to the intake volume, from the detection value of the temperature sensor 15 is installed into the storage unit 20a.

Next, an operation of the vehicle waste heat recovery device according to the first embodiment will be described.

As shown in FIG. 1, when the engine 6 is operated, power of the engine 6 is transmitted to the drive shaft 8 via the belt 12 so as to drive the pump 2. The liquid coolant discharged from the pump 2 undergoes heat exchange with the cooling water 7 of the engine 6 in the boiler 3 so as to form a gas. The gasified coolant is taken into the expander 4 so as to drive the expander 4. After being expanded by the expander 4, the coolant is cooled and condensed by the condenser 5 and then taken back into the pump 2. Thus, the coolant circulates through the Rankine cycle 1. A power generator, not shown in the drawings, is driven to generate power using power generated by the expander 4, whereupon the power generated by the expander 4 is transmitted to the engine 6 via the drive shaft 8. As the coolant circulates through the Rankine cycle 1, the temperature sensor 15 and the pressure sensor 16 respectively detect the temperature and the pressure of the coolant and transmit resulting detection values to the ECU 20.

As long as the temperature detected by the temperature sensor 15 remains equal to or lower than the upper limit temperature $T_0$, the ECU 20 adjusts the mass flow rate of the coolant flowing through the bypass passage 13 by adjusting the opening of the flow control valve 14 on the basis of the detection value of the pressure sensor 16 and the mass flow rate of the coolant flowing through the pump 2 (which is calculated from the rotation speed of the engine 6). When the flow rate of the coolant flowing through the bypass passage 13 is adjusted, the mass flow rate of the coolant flowing through the boiler 3 varies, leading to variation in the pressure of the coolant flowing out of the boiler 3, or in other words the coolant taken into the expander 4. By adjusting this pressure to a value that is as close as possible to the upper limit pressure $P_0$ on condition that the upper limit temperature $T_0$ is not exceeded, the thermal efficiency of the Rankine cycle 1 can be maintained at a high level.

When the ratio between the rotation speed of the engine 6 and the amount of waste heat varies such that the amount of waste heat increases relative to the rotation speed of the engine 6, the amount of heating applied to the coolant in the boiler 3 increases, leading to an increase in the temperature of the coolant flowing out of the boiler 3. When the ECU 20 detects that the detection value of the temperature sensor 15 exceeds the set temperature $T_1$ serving as a threshold set at a value lower than the upper limit temperature $T_0$, the ECU 20 determines the displacement of the solenoid valve 25 from the detection value of the temperature sensor 15 on the basis of the map installed in the storage unit 20a, and increases the intake volume of the expander 4 by adjusting the solenoid valve 25 to the determined displacement. As a result, an increase in the pressure of the coolant flowing out of the boiler 3 is suppressed, thereby creating a margin for allowing the mass flow rate of the coolant flowing through the boiler 3 to increase. By having the ECU 20 adjust the opening of the flow control valve 14 in order to increase the mass flow rate of the coolant flowing through the boiler 3, an increase in the temperature of the coolant flowing out of the boiler 3 can be suppressed, and as a result, the amount of recovered waste heat energy can be increased without limiting the amount of heat exchange performed by the boiler. By adjusting the mass flow rate of the coolant flowing through the boiler 3 so as to realize a pressure that is as close as possible to the upper limit pressure $P_0$ on condition that the upper limit temperature $T_0$ is not exceeded, reductions in the thermal efficiency of the Rankine cycle 1 can be minimized. In a case where the detection value of the temperature sensor 15 exceeds the upper limit temperature $T_0$ even when the intake volume of the expander 4 is at a maximum, limiting the supply of cooling water 7 to the boiler 3 and so on are performed.

Conversely, when the ratio between the rotation speed of the engine 6 and the amount of waste heat varies such that the amount of waste heat decreases relative to the rotation speed of the engine 6, the amount of heating applied to the coolant in the boiler 3 decreases, leading to a reduction in the temperature of the coolant flowing out of the boiler 3. As a result, the coolant may liquefy while being expanded by the expander 4 so that power can no longer be obtained. In this case, the ECU 20 determines the displacement of the solenoid valve 25 from the detection value of the temperature sensor 15 on the basis of the map installed in the storage unit 20a, and reduces the intake volume of the expander 4 by adjusting the solenoid valve 25 to the determined displacement. When, under this condition, the ECU 20 increases the opening of the flow control valve 14 in order to reduce the mass flow rate of the coolant flowing through the boiler 3, the temperature of the coolant flowing out of the boiler 3 increases, leading to a corresponding increase in the pressure of the coolant, and therefore the coolant flowing out the boiler 3 is controlled to a pressure as close as possible to the upper limit pressure $P_0$ on condition that the upper limit temperature $T_0$ is not exceeded. As a result, reductions in the thermal efficiency of the Rankine cycle 1 can be minimized.

Hence, by having the solenoid valve 25 increase the opening of the sub-port 24 in order to increase the intake volume of the expander 4 when the ratio between the rotation speed of the engine 6 and the amount of waste heat varies such that the detection value of the temperature sensor 15 exceeds the preset set temperature $T_1$, the mass flow rate of the coolant flowing through the boiler 3 can be increased. By increasing the mass flow rate of the coolant flowing through the boiler 3, an increase in the temperature of the coolant flowing out of the boiler 3 can be suppressed, and the pressure of the coolant flowing out of the boiler 3 can be controlled to the vicinity of the upper limit pressure $P_0$. Accordingly, the amount of heating applied to the coolant in the boiler 3 can be increased, leading to an increase in the amount of recovered waste heat energy. As a result, a reduction in the thermal efficiency of the Rankine cycle 1 can be suppressed even when the ratio between the rotation speed of the engine 6 and the amount of waste heat varies.

In the first embodiment, fine adjustments can be made to the opening of the sub-port 24, but the solenoid valve 25 may simply open and close the sub-port 24. In this case, the map installed in the storage unit 20a to determine the displacement of the solenoid valve 25 is not required, and the solenoid valve 25 opens and closes the sub-port 24 using the set temperature $T_1$ as a reference.

Second Embodiment

Next, a vehicle waste heat recovery device according to a second embodiment of the present invention will be described. Note that in the following embodiments, identical symbols to the reference symbols used in FIGS. 1 to 3 indicate identical or similar constitutional elements, and detailed description of these elements has been omitted.

The vehicle waste heat recovery device according to the second embodiment of the present invention differs from that of the first embodiment in that only the expander 4 is coupled to the engine 6 to be capable of transmitting power thereto.

Figure 4:
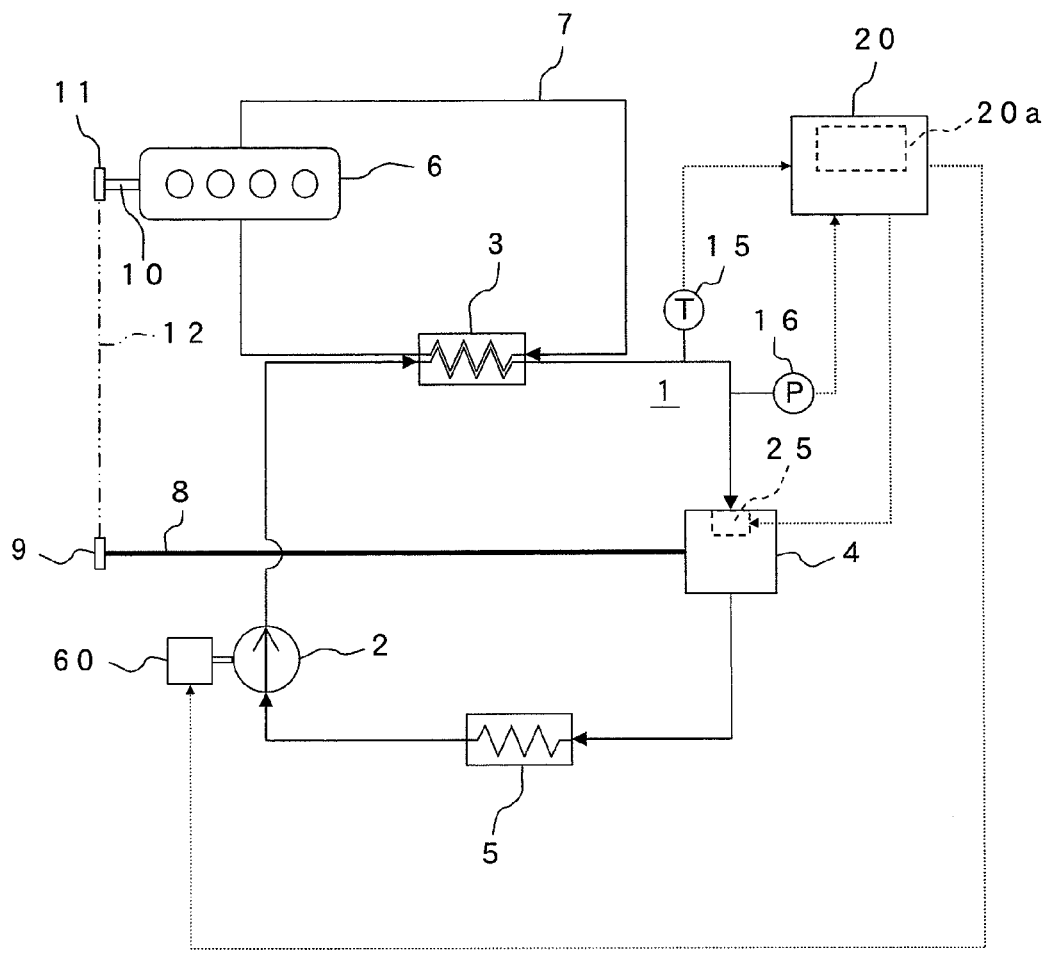
FIG. 4 is a constitutional diagram of a vehicle waste heat recovery device according to a second embodiment.

As shown in FIG. 4, the other end of the drive shaft 8 having the pulley 9 on one end is coupled to a rotary shaft, not shown in the drawing, of the expander 4. The pump 2 is driven by a motor 60. The motor 60 is electrically connected to the ECU 20. All other constitutions are identical to the first embodiment, except that the bypass passage 13 and the flow control valve 14 (see FIG. 1) of the first embodiment are omitted.

In the first embodiment, the ECU 20 adjusts the mass flow rate of the coolant flowing through the boiler 3 by controlling the opening of the flow control valve 14 (see FIG. 1). In the second embodiment, however, the ECU 20 adjusts the mass flow rate of the coolant flowing through the boiler 3 by controlling the rotation speed of the motor 60 to adjust the mass flow rate of the coolant circulating through the entire Rankine cycle 1. Note that the mass flow rate may be calculated from the rotation speed of the motor 60. All other operations of the second embodiment are identical to the operations of the first embodiment.

Third Embodiment

Next, a vehicle waste heat recovery device according to a third embodiment of the present invention will be described.

The vehicle waste heat recovery device according to the third embodiment of the present invention differs from that of the first embodiment in the form of the intake volume varying assembly.

Figure 5A:
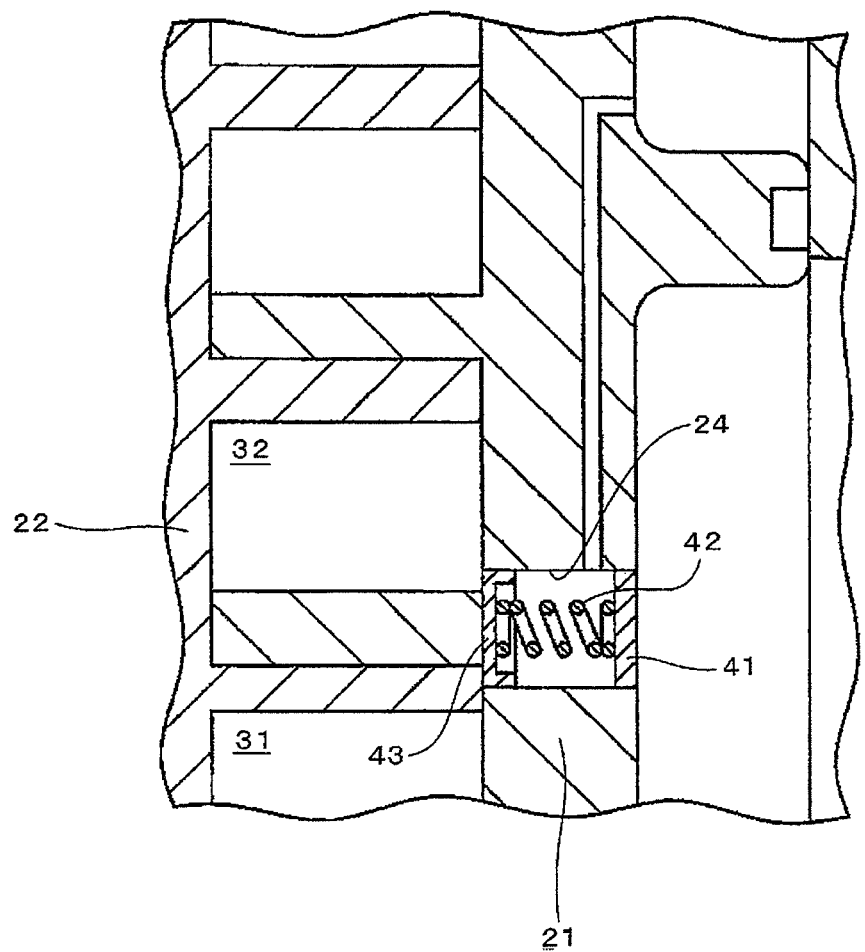
FIGS. 5A and 5B are lateral direction sectional views of an expansion mechanism portion of an expander provided in a vehicle waste heat recovery device according to a third embodiment.

As shown in FIG. 5A, in the sub-port 24, a fixed plate 41 is fixed to an end portion on side opposite the side on which the respective expansion spaces exist, and one end of a spring 42 is connected to the fixed plate 41. A spool 43 is connected to another end of the spring 42. When the spool 43 is brought into contact with the turning scroll 22 by an elastic force of the spring 42, the expansion space 31 and the expansion space 32 separate. The elastic force of the spring 42 is adjusted such that when the set pressure $P_1$ serving as a threshold having a smaller value than the upper limit pressure $P_0$ acts on the spool 43, the spring 42 is compressed. All other constitutions are identical to the first embodiment, except that the map is not installed in the storage unit 20a.

Figure 5B:
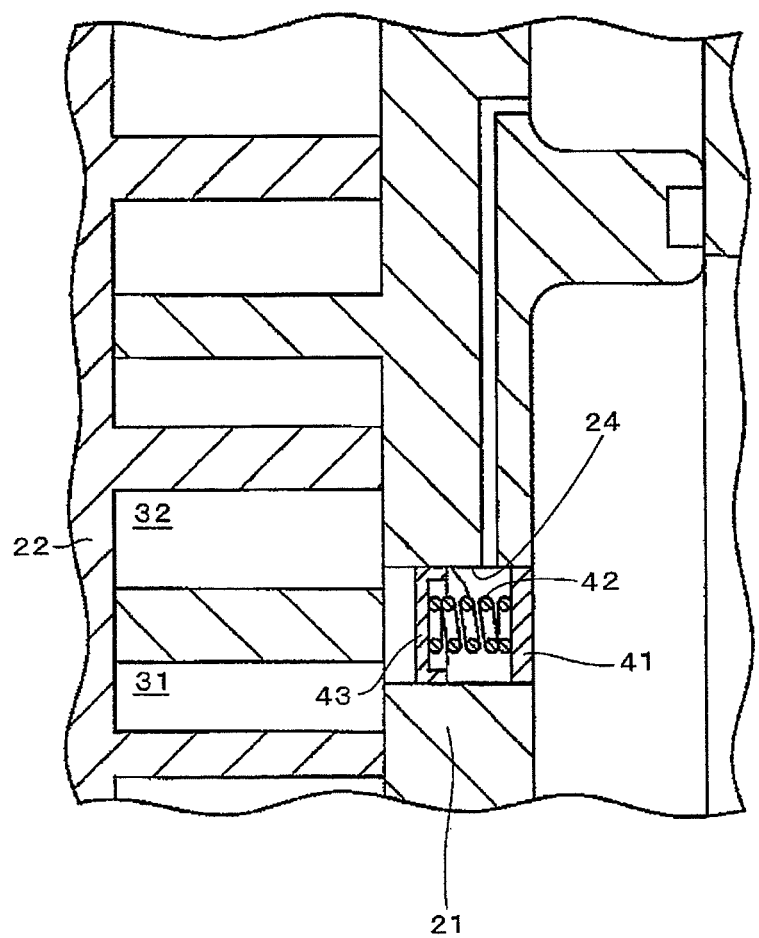

The ECU 20 adjusts the opening of the flow control valve 14 on the basis of the detection value of the temperature sensor 15 and the mass flow rate of the coolant flowing through the pump 2. When the ratio between the rotation speed of the engine 6 and the amount of waste heat varies such that the amount of waste heat increases relative to the rotation speed of the engine 6, leading to an increase in the temperature of the coolant flowing out of the boiler 3 (see FIG. 1), the opening of the flow control valve 14 is adjusted such that the mass flow rate of the coolant flowing through the boiler 3 increases. As the temperature of the coolant rises, the pressure of the coolant also rises. As shown in FIG. 5B, when the pressure of the coolant reaches the set pressure $P_1$ set to be lower than the upper limit pressure $P_0$, a pressure in the expansion space 31 acts on the spool 43 during the intake process. Hence, the spring 42 is compressed such that the spool 43 separates from the turning scroll 22, and as a result, the expansion space 31 and the expansion space 32 communicate with each other via the sub-port 24. Accordingly, a part of the coolant flowing into the expansion space 31 through the main port 23 flows into the expansion space 32 via the sub-port 24. As a result, the intake volume of the expander 4 (see FIG. 1) increases such that an increase in the pressure of the coolant flowing out of the boiler 3 is suppressed, and therefore the amount of recovered waste heat energy can be increased without limiting the amount of heat exchange performed in the boiler.

Hence, by varying the pressure in the expansion space 31 into which the coolant flowing out of the boiler 3 flows, the intake volume of the expander 4 can be adjusted autonomously, and therefore similar effects to the first embodiment can be obtained likewise in the third embodiment. Note that the intake volume varying assembly is constituted by the spring 42, the spool 43, and the sub-port 24. The intake volume varying assembly is capable of modifying the intake volume continuously by making fine adjustments to the displacement of the spool 43.

Fourth Embodiment

Next, a vehicle waste heat recovery device according to a fourth embodiment of the present invention will be described.

The vehicle waste heat recovery device according to the fourth embodiment of the present invention differs from that of the first embodiment in the form of the intake volume varying assembly.

Figure 6:
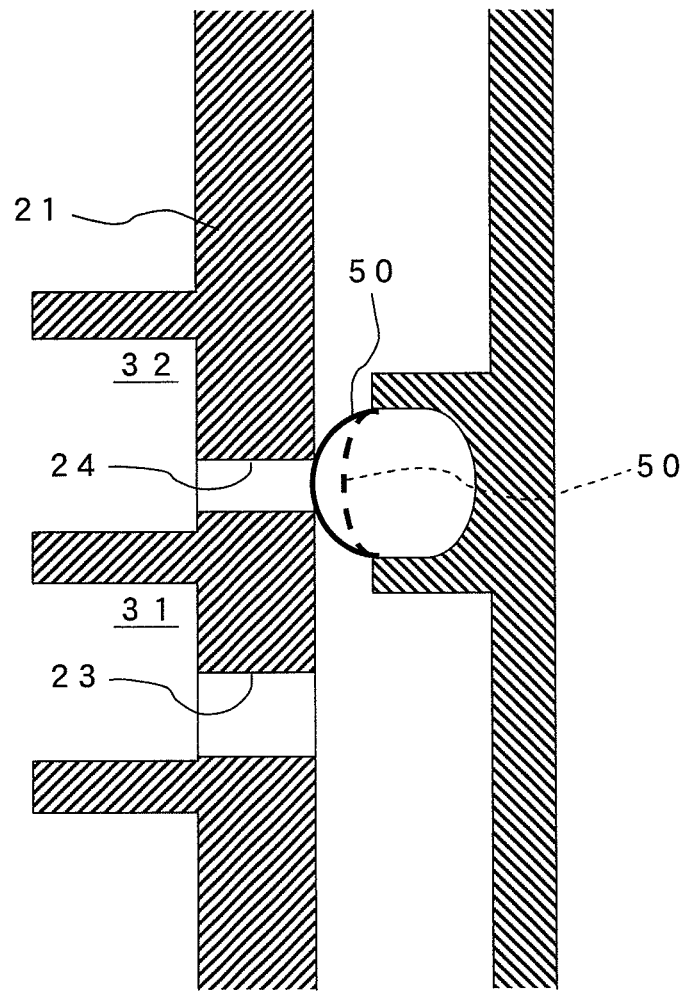
FIG. 6 is a lateral direction sectional view of an expansion mechanism portion of an expander provided in a vehicle waste heat recovery device according to a fourth embodiment.

As shown in FIG. 6, a bimetal valve 50 is provided to open and close the sub-port 24 from side opposite the side on which the respective expansion spaces exist. The bimetal valve 50 is formed by adhering two metal plates having different thermal expansion coefficients to each other. Of the two metal plates, a metal plate on the sub-port 24 side is made of a metal having a smaller thermal expansion coefficient than that of the metal plate on the opposite side. At low temperatures, the bimetal valve 50 warps so as to project toward the sub-port 24, thereby closing the sub-port 24 (as shown by the solid line in FIG. 6). When high-temperature coolant comes into contact with the bimetal valve 50 such that the temperature of the bimetal valve 50 rises, the degree of warping varies in accordance with the difference between the thermal expansion coefficients of the metal plates constituting the bimetal valve 50, and as a result, the sub-port 24 opens (as shown by the dotted line in FIG. 6). Note that the relationship between the shape of the bimetal valve 50 and the temperature may be set by selecting the materials of the two metal plates appropriately. All other constitutions are identical to the first embodiment, except that the temperature sensor 15 is omitted and the map is not installed in the storage unit 20a. In this embodiment, the bimetal valve 50 doubles as the temperature ascertaining device and a part of the intake volume varying assembly.

When the amount of heating applied to the coolant by the boiler 3 increases such that the temperature of the coolant flowing out the boiler 3 rises, the temperature of the bimetal valve 50 contacting the coolant also rises. When the temperature of the coolant exceeds the set temperature $T_1$ serving as a threshold, the shape of the bimetal valve 50 varies as shown by the dotted line in FIG. 6, whereby the opening of the sub-port 24 increases. Hence, the coolant flows into the expansion spaces 31 and 32 through both the main port 23 and the sub-port 24, thereby increasing the intake volume of the expander 4. Accordingly, an increase in the pressure of the coolant flowing out of the boiler 3 is suppressed. Further, the opening of the flow control valve 14 is adjusted in accordance with the detection value of the pressure sensor 16 and the mass flow rate of the coolant flowing through the pump 2. As long as the detection value of the pressure sensor 16 is no greater than the upper limit pressure $P_0$, control is then performed to increase the flow rate of the coolant flowing into the boiler 3 and raise the pressure of the coolant flowing out of the boiler 3 to a pressure in the vicinity of the upper limit pressure $P_0$. In so doing, the amount of recovered waste heat energy can be increased without limiting the amount of heat exchange performed in the boiler 3, and as a result, reductions in the thermal efficiency of the Rankine cycle 1 can be minimized.

Hence, the intake volume of the expander 4 can also be adjusted using the bimetal valve 50 that opens and closes the sub-port 24 in accordance with the temperature of the coolant flowing out of the boiler 3, and therefore effects similar to the first embodiment can be obtained in the fourth embodiment. Note that the intake volume varying assembly is constituted by the bimetal valve 50 and the sub-port 24. The intake volume can be modified continuously by making fine adjustments to the opening of the sub-port 24 using the bimetal valve 50.

In the first, third, and fourth embodiments, the low pressure path side end portion 13b of the bypass passage 13 is positioned between the condenser 5 and the pump 2. However, the present invention is not limited to this constitution, and the low pressure path side end portion 13b may be positioned between the expander 4 and the condenser 5. In the former case, only the coolant expanded by the expander 4 is condensed by the condenser 5, and therefore the load of the condenser 5 can be lightened, thereby reducing the possibility of an increase in low pressure. In the latter case, on the other hand, both the coolant expanded by the expander 4 and the coolant flowing through the bypass passage 13 are condensed by the condenser 5 and then taken into the pump 2, and therefore cavitation in the pump 2 can be prevented.

An internal heat exchanger may be provided in each of the first to fourth embodiments to perform heat exchange between the coolant pumped by the pump 2 and the coolant expanded by the expander 4. When the temperature of the coolant flowing out of the boiler 3 decreases in a case where the internal heat exchanger is provided, the coolant expanded by the expander 4 is positioned in the vicinity of a saturation vapor line on a Mollier diagram, and therefore the amount of heat exchange performed in the internal heat exchanger decreases. With the operations described in the first to fourth embodiments, however, the amount of heat exchange performed in the internal heat exchanger can be increased by controlling the temperature of the coolant flowing out of the boiler 3.

In the first to fourth embodiments, the temperature ascertaining device is the temperature sensor 15 that detects the temperature of the coolant flowing out of the boiler 3 directly. However, the temperature ascertaining device is not limited thereto, and since the temperature of the coolant flowing out of the boiler 3 is related to the opening of the accelerator in a vehicle and the amount of intake air taken into the engine 6, the temperature ascertaining device may also be an accelerator opening sensor, an intake air amount sensor, and so on.

What is claimed is:

1. A vehicle waste heat recovery device comprising:
a Rankine cycle constituted by a pump that pumps a working fluid, an expander that obtains mechanical energy by expanding said working fluid, a high pressure path that leads said working fluid discharged from said pump to said expander, a low pressure path that leads said working fluid discharged from said expander to said pump, a heat exchanger provided on said high pressure path to heat said working fluid by using waste heat from an engine of a vehicle, and a condenser provided on said low pressure path to condense said expanded working fluid;
a temperature ascertaining device for ascertaining a temperature of said working fluid flowing out of said heat exchanger;
a pressure ascertaining device for ascertaining a pressure of said working fluid flowing out of said heat exchanger; and
an intake volume varying assembly for adjusting an intake volume of said expander,
wherein said expander is coupled to said engine to transmit power thereto, a threshold being set in advance in relation to one of said temperature ascertained by said temperature ascertaining device and said pressure ascertained by said pressure ascertaining device such that when said threshold is exceeded, said intake volume varying assembly increases said intake volume of said expander, whereupon a flow rate of said working fluid flowing through said heat exchanger is adjusted on the basis of the other one of said temperature ascertained by said temperature ascertaining device and said pressure ascertained by said pressure ascertaining device.

2. The vehicle waste heat recovery device according to claim 1, wherein
said pump is also coupled to said engine to transmit power thereto,
said Rankine cycle further comprises:
a bypass passage that connects said high pressure path between said pump and said heat exchanger to said low pressure path; and
a flow rate control device provided in said bypass passage to adjust a flow rate of said working fluid flowing through said bypass passage,
said flow rate of said working fluid flowing through said heat exchanger being adjusted by having said flow rate control device adjust said flow rate of said working fluid flowing through said bypass passage.

3. The vehicle waste heat recovery device according to claim 1, wherein, when said temperature ascertained by said temperature ascertaining device exceeds said threshold, said intake volume varying assembly increases said intake volume of said expander, whereupon said flow rate of said working fluid flowing through said heat exchanger is adjusted on the basis of said pressure ascertained by said pressure ascertaining device.

4. The vehicle waste heat recovery device according to claim 3, wherein
said intake volume varying assembly comprises:
a bimetal valve formed by adhering two metal plates having different thermal expansion coefficients to each other; and
a port which is opened and closed by said bimetal valve and through which a part of said working fluid flowing through said heat exchanger passes when taken into said expander, and wherein
said intake volume of said expander is increased by having said bimetal valve open said port.

5. The vehicle waste heat recovery device according to claim 2, wherein a low pressure path side end portion of said bypass passage is positioned between said pump and said condenser.

6. The vehicle waste heat recovery device according to claim 2, wherein a low pressure path side end portion of said bypass passage is positioned between said condenser and said expander.

* * * * *